US010676858B2

(12) United States Patent
Katsumata et al.

(10) Patent No.: US 10,676,858 B2
(45) Date of Patent: Jun. 9, 2020

(54) CONDENSER AND CLEANING DEVICE

(71) Applicants: IHI Corporation, Tokyo (JP); IHI Machinery and Furnace Co., Ltd., Tokyo (JP)

(72) Inventors: Kazuhiko Katsumata, Inuyama (JP); Masatoshi Mitsuzuka, Kakamigahara (JP); Osamu Sakamoto, Kamo-gun (JP); Takahiro Nagata, Kamo-gun (JP)

(73) Assignees: IHI CORPORATION, Tokyo (JP); IHI MACHINERY AND FURNACE CO., LTD., Tokyo (JP)

( * ) Notice: Subject to any disclaimer, the term of this patent is extended or adjusted under 35 U.S.C. 154(b) by 28 days.

(21) Appl. No.: 15/358,276

(22) Filed: Nov. 22, 2016

(65) Prior Publication Data
US 2017/0073879 A1 Mar. 16, 2017

Related U.S. Application Data

(63) Continuation of application No. PCT/JP2015/068903, filed on Jun. 30, 2015.

(30) Foreign Application Priority Data

Jun. 30, 2014 (JP) .................................. 2014-134372
Jun. 15, 2015 (JP) .................................. 2015-120475

(51) Int. Cl.
*D06F 43/08* (2006.01)
*B08B 3/00* (2006.01)
(Continued)

(52) U.S. Cl.
CPC ......... *D06F 43/088* (2013.01); *B01D 5/0006* (2013.01); *B08B 3/00* (2013.01); *C23G 5/00* (2013.01); *F28D 1/0461* (2013.01); *F28D 7/024* (2013.01); *F28D 7/10* (2013.01); *F28F 1/40* (2013.01); *F28F 3/048* (2013.01);
(Continued)

(58) Field of Classification Search
CPC ........ D06F 43/088; D06F 43/083; F28D 7/02; F28D 2021/0063; F28D 2021/007; F28B 9/02; F28B 9/04; F28B 9/06; F28B 9/08; F28B 1/02; F28B 5/00; F28B 1/00;
(Continued)

(56) References Cited

U.S. PATENT DOCUMENTS 2,573,966 A * 11/1951 Hamlin ................. D06F 43/088
8/142
2,986,893 A * 6/1961 Skaredoff ............ B01D 5/0006
62/47.1
(Continued)

FOREIGN PATENT DOCUMENTS

CH          593470 A5    11/1977
CN         2879085 Y     3/2007
(Continued)

*Primary Examiner* — Marc Lorenzi
(74) *Attorney, Agent, or Firm* — Rothwell, Figg, Ernst & Manbeck, P.C.

(57) ABSTRACT

The present disclosure provides a drying chamber (condenser) including a container having a steam intake opening, the condenser liquefying steam taken from the steam intake opening into the container, and the drying chamber including a cooling pipe which is disposed in the container and through which coolant circulates.

10 Claims, 9 Drawing Sheets

(51) Int. Cl.

| | |
|---|---|
| *F28D 7/10* | (2006.01) |
| *F28F 1/40* | (2006.01) |
| *B01D 5/00* | (2006.01) |
| *F28F 3/04* | (2006.01) |
| *F28D 1/04* | (2006.01) |
| *F28D 7/02* | (2006.01) |
| *C23G 5/00* | (2006.01) |
| *F28B 1/02* | (2006.01) |
| *F28D 1/06* | (2006.01) |
| *F28B 9/08* | (2006.01) |
| *F28B 9/04* | (2006.01) |
| *F28D 21/00* | (2006.01) |
| *F28B 9/02* | (2006.01) |

(52) U.S. Cl.
CPC .............. *B08B 2230/01* (2013.01); *F28B 1/02* (2013.01); *F28B 9/02* (2013.01); *F28B 9/04* (2013.01); *F28B 9/08* (2013.01); *F28D 1/06* (2013.01); *F28D 2021/0063* (2013.01)

(58) Field of Classification Search
CPC ....... F28B 1/06; B01D 5/0006; B01D 5/0003; B08B 2203/00; B08B 3/00
USPC .......................................................... 157/163
See application file for complete search history.

(56) References Cited

U.S. PATENT DOCUMENTS

| | | | | | |
|---|---|---|---|---|---|
| 3,308,839 | A | * | 3/1967 | Barday | .................... B01D 1/02 |
| | | | | | 134/107 |
| 3,482,625 | A | * | 12/1969 | Bray | ........................ F28B 1/02 |
| | | | | | 159/16.3 |
| 3,834,448 | A | * | 9/1974 | Cooksley | .................. C02F 1/04 |
| | | | | | 165/154 |
| 5,820,641 | A | * | 10/1998 | Gu | ....................... B01D 5/0006 |
| | | | | | 55/434.4 |
| 2005/0115699 | A1 | | 6/2005 | Nuris et al. | |
| 2012/0318017 | A1 | | 12/2012 | Cheng | |
| 2014/0246056 | A1 | | 9/2014 | Hiramoto et al. | |
| 2015/0083379 | A1 | | 3/2015 | Ito et al. | |

FOREIGN PATENT DOCUMENTS

| | | |
|---|---|---|
| CN | 201488605 U | 5/2010 |
| CN | 201488607 U | 5/2010 |
| DE | 29 27 193 A1 | 1/1981 |
| DE | 60 2005 002 995 T2 | 8/2008 |
| JP | 7-4889 A | 1/1995 |
| JP | 10-57909 A | 3/1998 |
| JP | 11-159977 A | 6/1999 |
| JP | 2000-304465 A | 11/2000 |
| JP | 2004-53031 A | 2/2004 |
| JP | 2006-226660 A | 8/2006 |
| JP | 2008-45775 A | 2/2008 |
| JP | 2013-29228 A | 2/2013 |
| JP | 2014-73453 A | 4/2014 |
| KR | 2002-0096794 A | 12/2002 |
| WO | 2013/077336 A1 | 5/2013 |
| WO | 2013/183113 A1 | 12/2013 |

* cited by examiner

CONDENSER AND CLEANING DEVICE

CROSS REFERENCE TO RELATED APPLICATIONS

This application is a continuation application based on a PCT Patent Application No. PCT/JP2015/068903, filed on Jun. 30, 2015, whose priority is claimed on Japanese Patent Application No. 2014-134372, filed Jun. 30, 2014 and Japanese Patent Application No. 2015-120475, filed Jun. 15, 2015. The contents of both the PCT application and the Japanese Patent Application are incorporated herein by reference.

TECHNICAL FIELD

The present disclosure relates to a condenser and a cleaning device.

BACKGROUND ART

Patent Document 1 discloses a vacuum cleaning device including a steam chamber that generates steam of a hydrocarbon-based cleaning agent, a cleaning chamber that cleans a workpiece in a decompressed state using the steam of the hydrocarbon-based cleaning agent supplied from the steam chamber, and a drying chamber which is connected to the cleaning chamber via an opening/closing valve and is maintained in a decompressed state and a low-temperature state. In this vacuum cleaning device, when cleaning of the workpiece is finished in the cleaning chamber, the opening/closing valve is open so that the cleaning chamber and the drying chamber communicate with each other to dry the workpiece.

That is, in this vacuum cleaning device, the drying chamber maintained in the decompressed state communicates with the cleaning chamber which is in a higher pressure state than the drying chamber due to the supply of steam during cleaning whereby a cleaning solution adhering to the workpiece vaporizes instantaneously and moves from the cleaning chamber to the drying chamber where the vaporized cleaning solution condenses. As a result, the workpiece is dried. Patent Document 2 also discloses a vacuum cleaning device having the same drying chamber (condensing chamber) as Patent Document 1.

DOCUMENT OF RELATED ART

Patent Document

[Patent Document 1]
Japanese Unexamined Patent Application, First Publication No. 2014-073453
[Patent Document 2]
International Patent Publication No. 2013/077336

SUMMARY

Technical Problem

However, in recent years, there have been demands to shorten the manufacturing processes to improve productivity at a production site. Thus, it is necessary to shorten the workpiece drying time in a vacuum cleaning device. In order to shorten the drying time, it is necessary to further improve the condensation performance of a condenser of a drying chamber.

In view of the foregoing, an object of the present disclosure is to improve the condensation performance of a condenser as compared to the conventional condenser.

Solution to Problem

According to a first aspect of the condenser of the present disclosure, there is provided a condenser including a container having a steam intake opening, the condenser liquefying steam taken from the steam intake opening into the container, the condenser including: a cooling pipe which is disposed in the container and through which coolant circulates.

According to a second aspect of the condenser of the present disclosure, the cooling pipe is wound in a spiral form.

According to a third aspect of the condenser of the present disclosure, the cooling pipe is disposed so that a central opening formed by the cooling pipe being wound in a spiral form faces the steam intake opening.

According to a fourth aspect of the condenser of the present disclosure, the container has a dual-shell structure in which the coolant can freely circulate.

According to a fifth aspect of the condenser of the present disclosure, there is provided a condenser that liquefies steam taken in from a steam intake opening formed in a vertical attitude, wherein a plurality of fins are provided on a surface facing the steam intake opening.

According to a sixth aspect of the condenser of the present disclosure, the condenser includes: a first flat surface portion in which the plurality of fins are provided and of which the outer circumference is circular or oval; a second flat surface portion in which the steam intake opening is formed and which is approximately parallel to the first flat surface portion; and an endless circumferential surface portion that connects an outer circumference of the first flat surface portion and an outer circumference of the second flat surface portion.

According to a seventh aspect of the condenser of the present disclosure, the plurality of fins extends in a vertical direction and are provided at predetermined intervals in the vertical direction.

According to an eighth aspect of the condenser of the present disclosure, there is provided a condenser that liquefies steam taken in from a steam intake opening formed in a vertical attitude, wherein a plurality of fins are provided on a surface facing the steam intake opening, and the facing surface is formed in a dual-shell structure in which coolant can freely circulate.

According to a ninth aspect of the condenser of the present disclosure, in the eighth aspect, the condenser includes: a first flat surface portion in which the plurality of fins are provided and of which the outer circumference is circular or oval; a second flat surface portion in which the steam intake opening is formed and which is approximately parallel to the first flat surface portion; and an endless circumferential surface portion that connects an outer circumference of the first flat surface portion and an outer circumference of the second flat surface portion.

According to a tenth aspect of the condenser of the present disclosure, in the eighth or ninth aspect, the plurality of fins extend in a vertical direction and are provided at predetermined intervals in the vertical direction.

According to an eleventh aspect of the condenser of the present disclosure, there is provided a cleaning device including the condenser according to any one of the first to tenth aspects.

Effects

According to the present disclosure, since the drying chamber includes the cooling pipe provided inside the container having the steam intake opening, it is possible to maintain the drying chamber temperature at a temperature lower than the cleaning chamber temperature. As a result, it is possible to shorten the condensation period of the drying chamber (condenser) and to improve the condensation performance as compared to the conventional device.

DESCRIPTION OF EMBODIMENTS

Hereinafter, a first embodiment of the present disclosure will be described with reference to the drawings.

Figure 1:
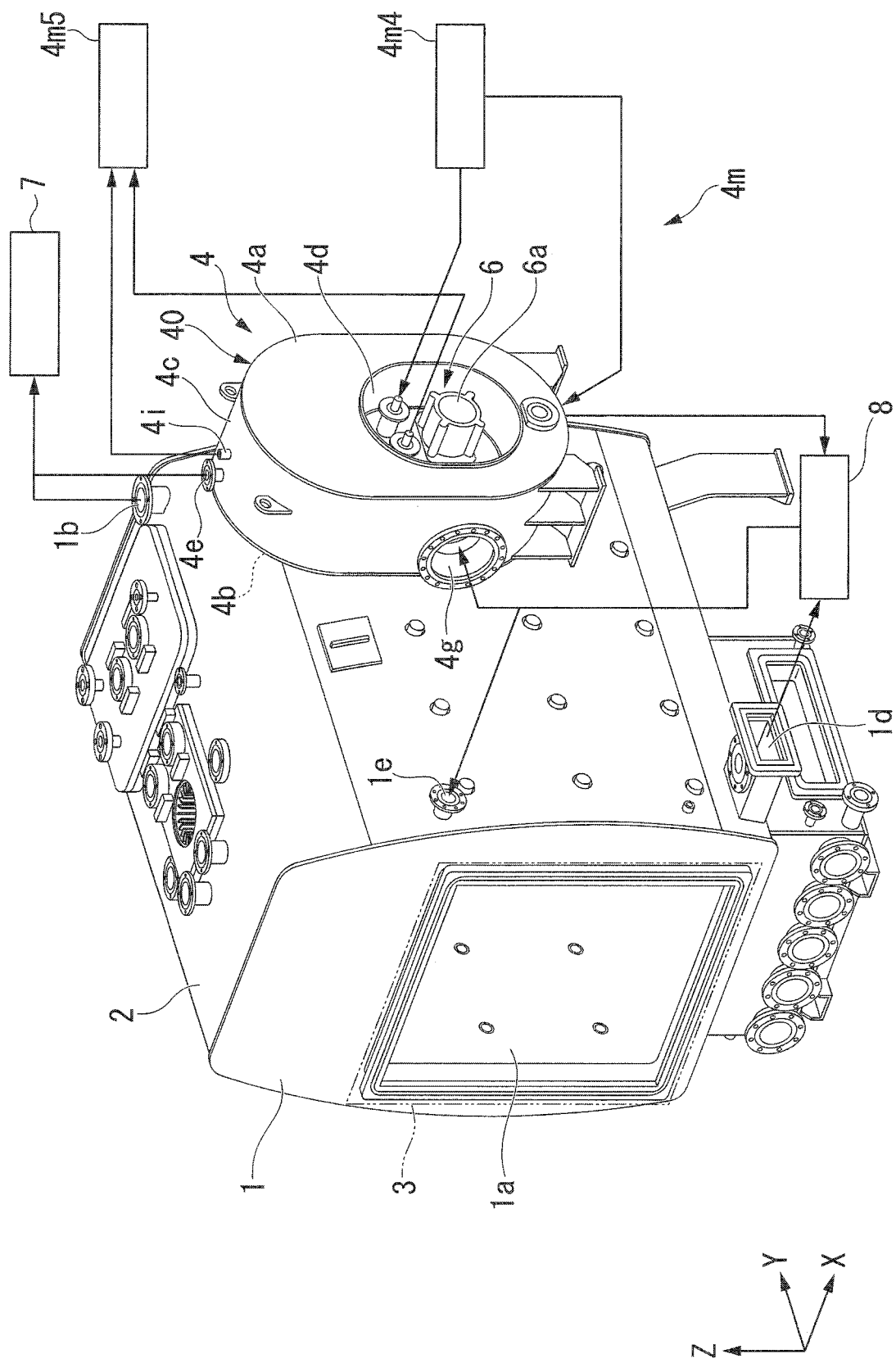
FIG. 1 is a perspective view illustrating a general schematic configuration of a vacuum cleaning device according to a first embodiment of the present disclosure.
Figure 3:
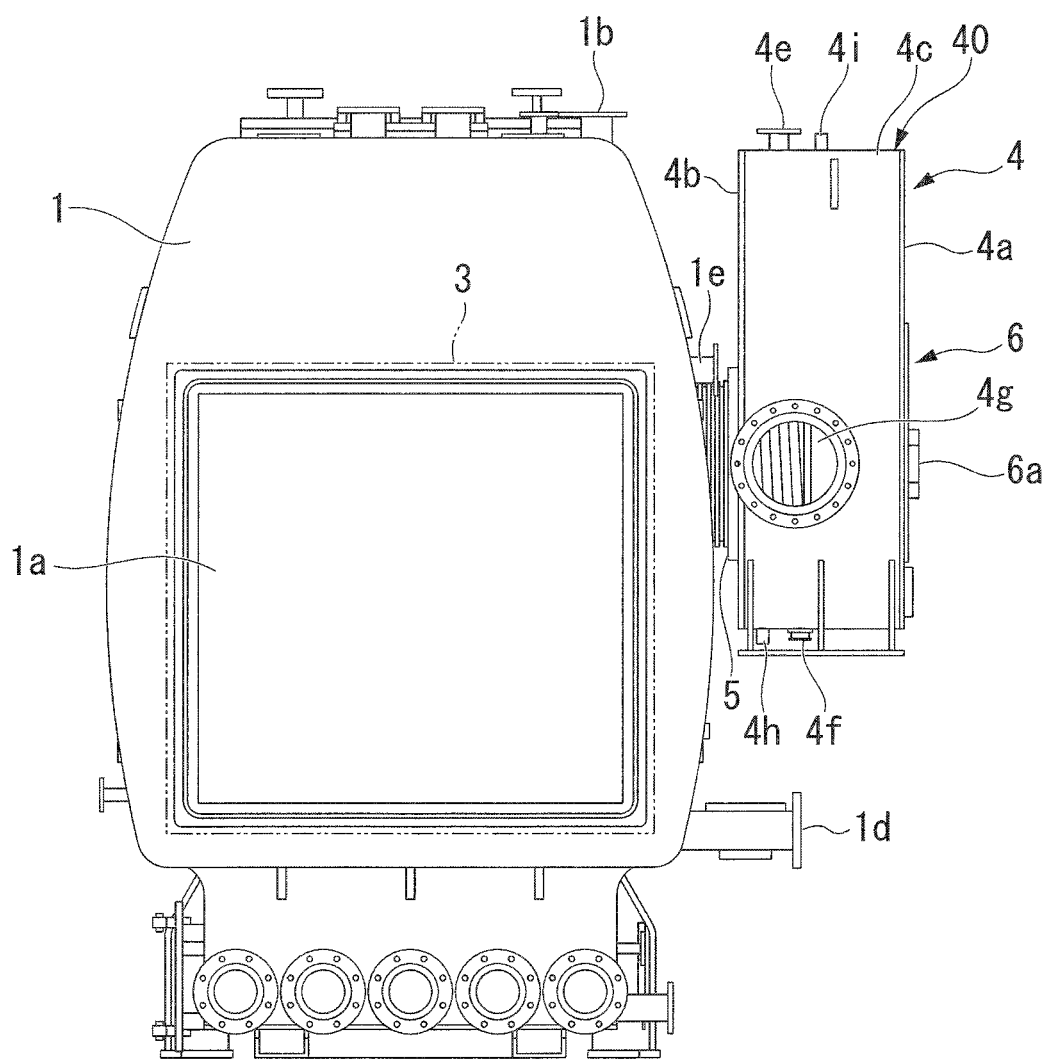
FIG. 3 is a front view illustrating a schematic configuration of the vacuum cleaning device according to the first embodiment of the present disclosure.

As illustrated in FIG. 1 or 3, a vacuum cleaning device according to the first embodiment includes a cleaning chamber 1, a steam generation unit 2, a front door 3, a drying chamber 4, a connection member 5, an opening/closing mechanism 6, a vacuum pump 7, and a regenerating concentrator 8. Among these constituent elements, the drying chamber 4 is a condenser according to the present embodiment.

First, an outline of the vacuum cleaning device according to the first embodiment will be described. This vacuum cleaning device is a device that cleans a workpiece (cleaning object) by applying the steam of a cleaning agent (cleaning steam) to the workpiece to which contamination components are adhered. That is, this vacuum cleaning device supplies the cleaning steam to the cleaning chamber 1 continuously for a predetermined period (cleaning period) to allow the cleaning steam to repeatedly adhere to and condense on the surface of the workpiece stored in the cleaning chamber 1. In this way, the contamination components adhering to the surface of the workpiece stored in the cleaning chamber 1 are cleaned off from the surface of the workpiece together with the condensed solution of the cleaning agent. The workpiece is, for example, a metal part to a surface of which contamination components such as cutting oil or the like adhere during machining.

Such a vacuum cleaning device is installed on a predetermined pedestal so that a vertical direction of the vacuum cleaning device extends along the Z-axis among the X, Y, and Z axes illustrated as orthogonal coordinate axes in FIG. 1. In FIG. 1, constituent elements which are not directly associated with the features of the vacuum cleaning device according to the present embodiment (for example, various pipes and valves) are not illustrated for the sake of convenience. In an actual vacuum cleaning device (actual device), a plurality of pipes and valves are mounted around the constituent elements and exterior parts are also mounted on the outer side of the constituent elements.

The cleaning chamber 1 is formed in a generally hollow rectangular parallelepiped shape (approximately a box shape) and the workpiece (cleaning object) is stored in an inner space. An opening (work insertion opening 1a) is formed in one side surface (front surface) of the cleaning chamber 1. The workpiece insertion opening 1a is an opening in a vertical attitude, for loading and unloading the workpiece between the cleaning chamber 1 and the outside and has a rectangular shape as illustrated in the drawing. A sealing member for closely adhering to the front door 3 is formed on an entire circumference outside the periphery of the workpiece insertion opening 1a.

Figure 2:
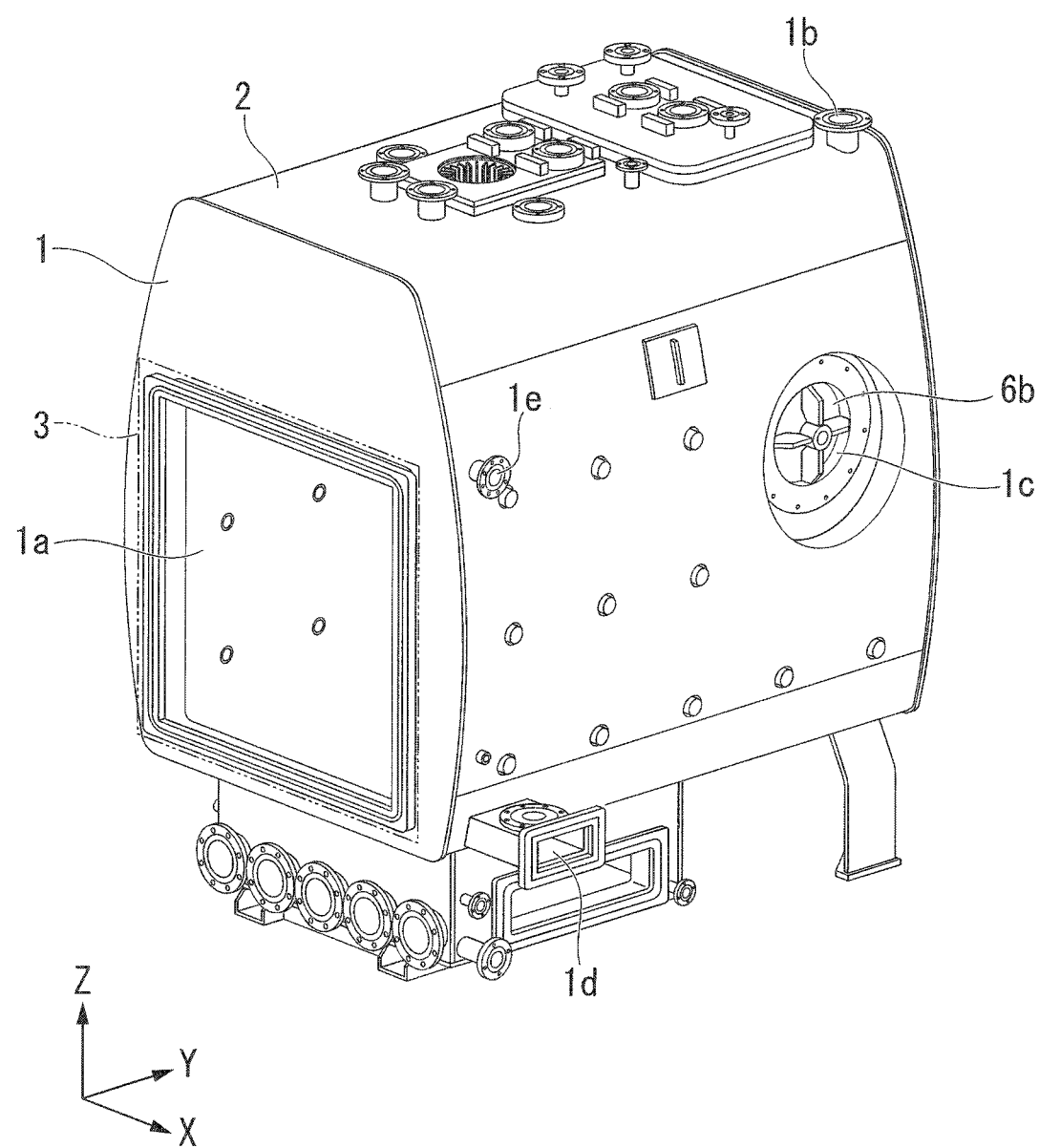
FIG. 2 is a perspective view illustrating a state in which a condenser is removed from the vacuum cleaning device according to the first embodiment of the present disclosure.

Moreover, a discharge port 1b is formed in an upper portion near the rear surface of such a cleaning chamber 1. The discharge port 1b is an opening for discharging the air in the cleaning chamber 1 to the outside and is connected to the vacuum pump 7 by a pipe (not illustrated). Moreover, as illustrated in FIG. 2, a circular opening (drying chamber opening 1c) for allowing the cleaning chamber 1 to communicate with the drying chamber 4 is formed in a side surface of the cleaning chamber 1 adjacent to the drying chamber 4. That is, the cleaning chamber 1 communicates with the drying chamber 4 via the drying chamber opening 1c.

Further a drainage port 1d and a steam intake port 1e are formed in a side portion of the cleaning chamber 1. The drainage port 1d is an opening for discharging a mixed solution of the cleaning solution and the contamination components generated during cleaning of the workpiece to the outside of the cleaning chamber 1 and is connected to the regenerating concentrator 8 by a pipe (not illustrated). The steam intake port 1e is an opening for taking the steam of the cleaning solution generated by the regenerating concentrator 8 into the cleaning chamber 1 and is connected to the regenerating concentrator 8 by a pipe (not illustrated).

The steam generation unit 2 is provided in an upper portion of the cleaning chamber 1 to generate the steam of the cleaning agent. The steam generation unit 2 includes a heating unit that, for example, heats a cleaning agent to generate cleaning steam and a steam tank that temporarily stores the cleaning steam. The steam generated by the heating unit is temporarily stored in the steam tank and the cleaning steam is supplied to the cleaning chamber 1 via the steam tank. According to such a steam generation unit 2, since the steam tank is provided, it is possible to stably supply a predetermined amount of cleaning steam to the cleaning chamber 1 for the cleaning period.

The cleaning agent is a hydrocarbon-based cleaning agent such as, for example, a normal paraffin-based cleaning agent, an isoparaffinic cleaning agent, a naphthenic cleaning agent, or an aromatic cleaning agent. More specifically, the cleaning agent is a third-class petroleum-based cleaning agent such as Teclean (registered trademark) N20, Cleansol G, and Daphne solvents which are generally known as cleaning solvents.

The front door 3 is a flat plate-like member that is provided on a front surface of the cleaning chamber 1 to close or open the workpiece insertion opening 1a. The front door 3 is, for example, a sliding door and is disposed in a vertical attitude to face the workpiece insertion opening 1a similarly to the workpiece insertion opening 1a in the vertical attitude. The front door 3 closes or opens the workpiece insertion opening 1a by moving in a left-right direction (the X-axis direction) while maintaining the vertical attitude. The front door 3 seals the cleaning chamber 1 by coming in contact with the sealing member provided outside (the side close to the front door 3) the periphery of the workpiece insertion opening 1a.

The drying chamber 4 has a round box shape as illustrated in FIG. 1 and is a condenser that condenses (liquefies) the steam (residual steam) taken in from the cleaning chamber 1. In a state in which cleaning of the workpiece is finished in the cleaning chamber 1, the surface of the workpiece and the inner surface of the cleaning chamber 1 are wet with the cleaning agent. The drying chamber 4 takes in the steam of the cleaning agent remaining in the cleaning chamber 1 after the workpiece is cleaned (residual steam) from the cleaning chamber 1 and condenses (liquefies) the steam, which will be described in detail later.

Figure 4:
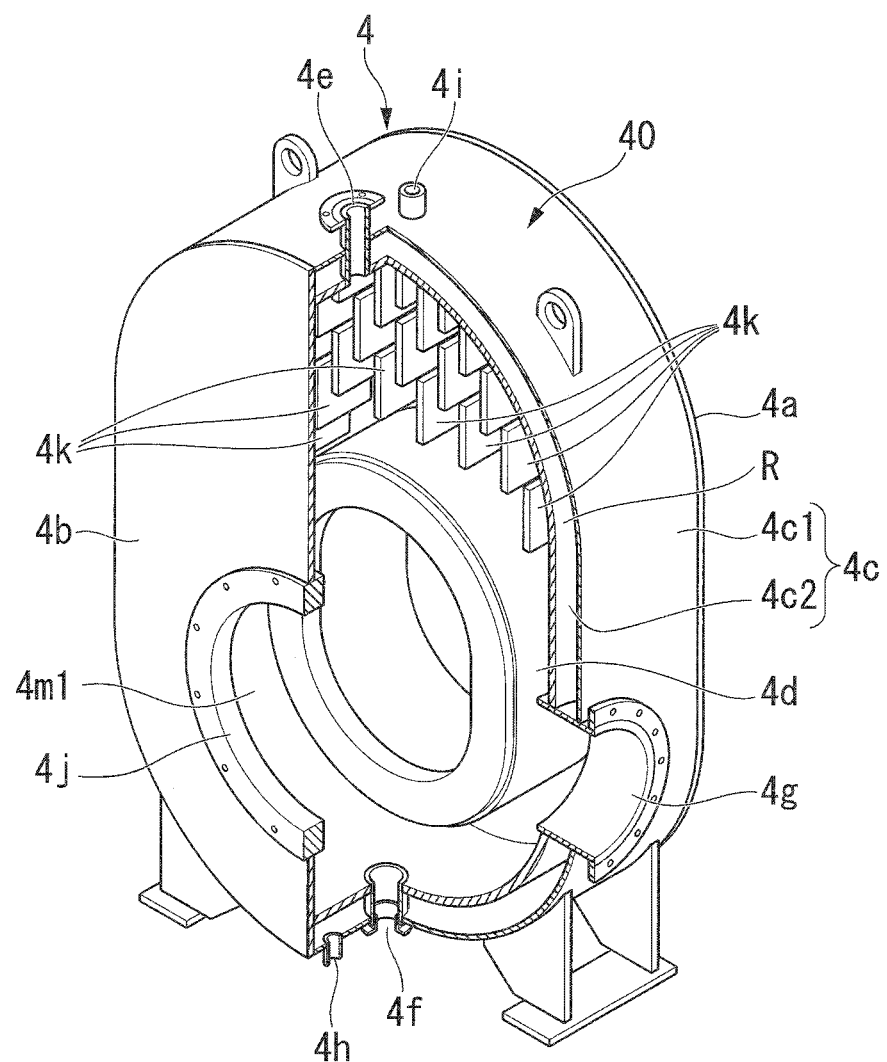
FIG. 4 is a perspective view illustrating a detailed configuration of a condenser according to the first embodiment of the present disclosure.

As illustrated in FIGS. 3 and 4 as well as FIG. 1, the drying chamber 4 includes a first flat surface portion 4a, a second flat surface portion 4b, a circumferential surface portion 4c, a depression portion 4d, a discharge port 4e, a drainage port 4f, a steam intake port 4g, a coolant intake port 4h, a coolant drainage port 4i, a steam intake opening 4j, a plurality of fins 4k, and a temperature maintaining device 4m. In the present embodiment, the first flat surface portion 4a, the second flat surface portion 4b, the circumferential surface portion 4c, the depression portion 4d, the discharge port 4e, the drainage port 4f, the steam intake port 4g, the coolant intake port 4h, the coolant drainage port 4i, and the steam intake opening 4j form a container 40 (corresponding to a container of the present disclosure).

The first flat surface portion 4a is a plate portion in which the plurality of fins 4k are formed and of which the outer circumference is oval. The second flat surface portion 4b is a plate portion in which the steam intake opening 4j is formed and which has approximately the same shape as the first flat surface portion 4a and is approximately parallel to the first flat surface portion 4a. That is, the second flat surface portion 4b is a portion of which the outer circumference is oval similarly to the first flat surface portion 4a. The first flat surface portion 4a and the second flat surface portion 4b which are in a parallel relation are in a vertical attitude.

The circumferential surface portion 4c is an endless plate portion that connects the outer circumference of the first flat surface portion 4a and the outer circumference of the second flat surface portion 4b. As illustrated in FIG. 4, the circumferential surface portion 4c has a dual-shell structure which includes an outer circumferential wall 4c1 and an inner circumferential wall 4c2 and in which a coolant can freely circulate. That is, in the circumferential surface portion 4c, a passage through which a coolant circulates (coolant passage R) is formed between the outer circumferential wall 4c1 and the inner circumferential wall 4c2 which face each other with a predetermined distance therebetween.

The coolant passage R communicates with the coolant intake port 4h and the coolant drainage port 4i. Although not illustrated in FIG. 4, the first flat surface portion 4a also has the dual-shell structure similarly to the circumferential surface portion 4c. The first flat surface portion 4a, the second flat surface portion 4b, and the circumferential surface portion 4c form the drying chamber 4.

As illustrated in FIG. 1, the depression portion 4d is a portion in which a predetermined area displaced slightly downward from the center of the first flat surface portion 4a is depressed. A portion (air cylinder 6a or the like) of the opening/closing mechanism 6 is attached to a bottom portion of the depression portion 4d (a portion of the first flat surface portion 4a). The discharge port 4e is an opening for discharging the air in the drying chamber 4 to the outside and is connected to the vacuum pump 7 by a pipe (not illustrated). The drainage port 4f is an opening for discharging a condensed solution generated when the residual steam is condensed in the drying chamber 4 (residual condensed solution) to the outside and is connected to the regenerating concentrator 8 by a pipe (not illustrated).

The steam intake port 4g is an opening for taking the steam of the cleaning solution generated by the regenerating concentrator 8 (regeneration steam) into the drying chamber 4 and is connected to the regenerating concentrator 8 by a pipe (not illustrated). The coolant intake port 4h is an opening for taking the coolant into the coolant passage R and is connected to a coolant supply unit 4m4 by a pipe (not illustrated). The coolant drainage port 4i is an opening for discharging the coolant in the coolant passage R to the outside of the drying chamber 4 and is connected to a coolant collection unit 4m5 by a pipe (not illustrated).

The steam intake opening 4j is a circular opening having a predetermined size, formed in the second flat surface portion 4b. The steam intake opening 4j is formed at a position corresponding to the position of the depression portion 4d formed in the first flat surface portion 4a (that is, a position which is slightly displaced downward from the center of the second oval flat surface portion 4b).

As illustrated in FIG. 4, the plurality of fins 4k are rectangular planar members formed on the inner side of the first flat surface portion 4a to protrude toward the drying chamber 4. That is, these fins 4k are formed on the inner surface of the first flat surface portion 4a, which faces the steam intake opening 4j. More specifically, these fins 4k are formed on the upper side only of the depression portion 4d of the first flat surface portion 4a and are provided at predetermined intervals in a vertical direction and a horizontal direction to extend in the vertical direction (Z-axis direction).

Figure 5:
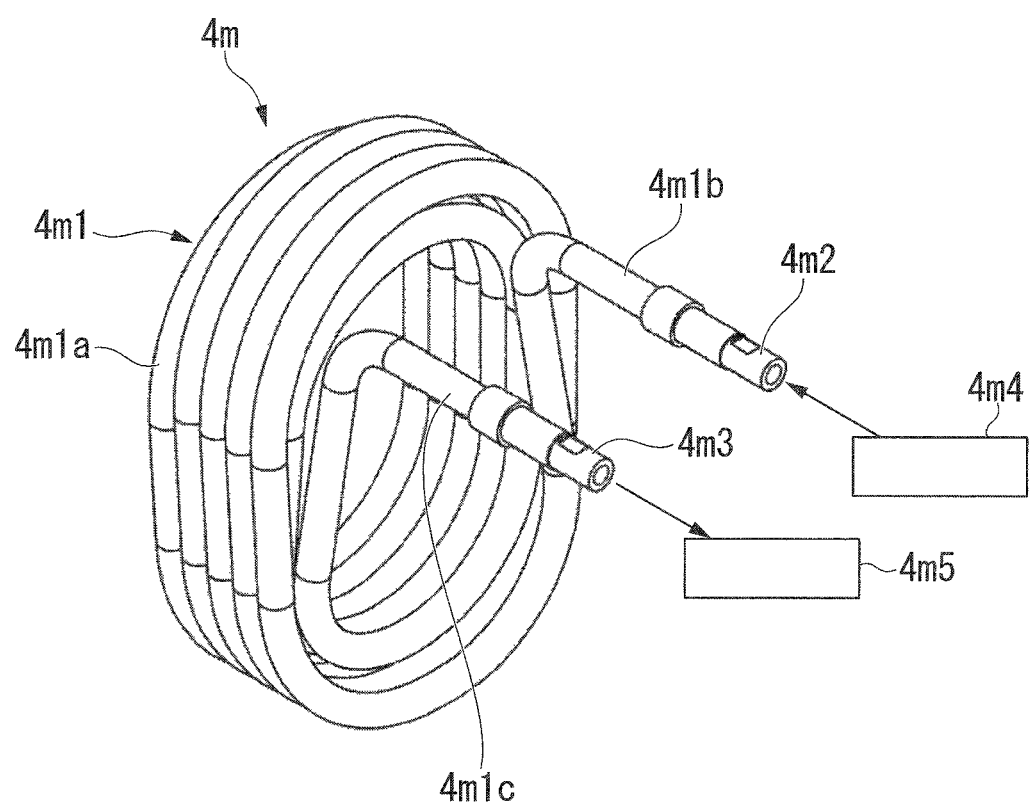
FIG. 5 is a perspective view illustrating a detailed configuration of a cooling pipe according to the first embodiment of the present disclosure.

The temperature maintaining device 4m is a device that maintains the temperature of the drying chamber 4 (drying chamber temperature) at a predetermined temperature lower than the temperature of the cleaning chamber 1 (cleaning chamber temperature). As illustrated in FIG. 5, the temperature maintaining device 4m includes a cooling pipe 4m1, a supply-side pipe end nozzle 4m2, a collection-side pipe end nozzle 4m3, the coolant supply unit 4m4, and the coolant collection unit 4m5.

The cooling pipe 4m1 is a pipe through which the coolant circulates and has a cooling pipe central portion 4m1a, a supply-side cooling pipe end 4m1b, and a collection-side cooling pipe end 4m1c. The cooling pipe central portion 4m1a is a body portion excluding the ends of the cooling pipe 4m1. The cooling pipe central portion 4m1a is fixed between the depression portion 4d and the second flat surface portion 4b and is spirally wound in an oval form with the long axis thereof extending in a vertical direction. That is, the cooling pipe central portion $4m1a$ is disposed such that a central opening formed by the cooling pipe central portion $4m1a$ being wound in a spiral form faces the steam intake opening $4j$ inside the container 40.

The supply-side cooling pipe end $4m1b$ is one end of the cooling pipe $4m1$. Moreover, the supply-side cooling pipe end $4m1b$ passes through the bottom portion of the depression portion $4d$ to protrude toward the outside of the container 40, and the supply-side pipe end nozzle $4m2$ is attached to the supply-side cooling pipe end $4m1b$. The collection-side cooling pipe end $4m1c$ is the other end of the cooling pipe $4m1$. Moreover, the collection-side cooling pipe end $4m1c$ passes through the bottom portion of the depression portion $4d$ to protrude toward the outside of the container 40, and the collection-side pipe end nozzle $4m3$ is attached to the collection-side cooling pipe end $4m1c$.

The supply-side pipe end nozzle $4m2$ is connected to the coolant supply unit $4m4$ by a pipe (not illustrated). Moreover, the collection-side pipe end nozzle $4m3$ is connected to the coolant collection unit $4m5$ by a pipe (not illustrated). The coolant supply unit $4m4$ supplies the coolant to the cooling pipe $4m1$. The coolant is, for example, water. The coolant collection unit $4m5$ collects the coolant from the cooling pipe $4m1$. The coolant collected by the coolant collection unit $4m5$ is cooled again by, for example, a cooling device (not illustrated) and flows into the coolant supply unit $4m4$. Moreover, the coolant supply unit $4m4$ also supplies the coolant to the coolant passage R. Further, the coolant collection unit $4m5$ also collects the coolant from the coolant passage R.

When the coolant is supplied from the coolant supply unit $4m4$ to the cooling pipe $4m1$ and the coolant circulates in the cooling pipe central portion $4m1a$, the inside of the drying chamber 4 is cooled and the drying chamber temperature is maintained at a temperature lower than the cleaning chamber temperature. The drying chamber temperature which is set and maintained by the temperature maintaining device $4m$ is, for example, 5 to 50° C. The drying chamber temperature is set and maintained at a predetermined temperature by a predetermined coolant supplied from the coolant supply unit $4m4$ to the coolant passage R as well as the temperature maintaining device $4m$.

The connection member 5 is a cylindrical member that connects the drying chamber opening $1c$ of the cleaning chamber 1 and the steam intake opening $4j$ of the drying chamber 4 and an axial direction thereof is set to the horizontal direction (X-axis direction). The connection member 5 is, for example, a cylindrical metallic bellows and is disposed between the drying chamber opening $1c$ and the steam intake opening $4j$. In the vacuum cleaning device according to the present embodiment, since the connection member 5 is configured as a metallic bellows, the influence of thermal deformation of the cleaning chamber 1 on the drying chamber 4 is reduced.

The opening/closing mechanism 6 is configured to close or open the drying chamber opening $1c$ illustrated in FIG. 2 and includes the air cylinder $6a$ illustrated in FIG. 1, a valve body $6b$ illustrated in FIG. 2, and the like. The air cylinder $6a$ is provided in the depression portion $4d$ so that a movable rod thereof extends in the axial direction (X-axis direction) of the connection member 5. Moreover, the valve body $6b$ is fixed to the distal end of the movable rod. The valve body $6b$ is a circular member provided on a side of the drying chamber opening $1c$ close to the cleaning chamber 1 and has a shape slightly larger than the drying chamber opening $1c$. The valve body $6b$ is connected to the distal end of the movable rod on the side of the drying chamber opening $1c$ close to the connection member 5 (close to the drying chamber 4).

The opening/closing mechanism 6 closes the drying chamber opening $1c$ when the air cylinder $6a$ draws the movable rod and the outer circumferential portion of the valve body $6b$ comes into contact with the inner surface of the drying chamber opening $1c$ (the side surface of the cleaning chamber 1). On the other hand, the opening/closing mechanism 6 opens the drying chamber opening $1c$ when the air cylinder $6a$ pushes the movable rod and the outer circumferential portion of the valve body $6b$ moves away from the inner surface of the drying chamber opening $1c$ (the side surface of the cleaning chamber 1).

The vacuum pump 7 is connected to the discharge ports $1b$ and $4e$ via a pipe (not illustrated) to discharge the air in the cleaning chamber 1 and the drying chamber 4 to the outside. The regenerating concentrator 8 is connected to the drainage ports $1d$ and $4f$ and the steam intake ports $1e$ and $4g$ via a pipe (not illustrated) to re-liquefy only the cleaning agent among the cleaning agent and the condensed solution of the contamination components collected from the cleaning chamber 1 and the drying chamber 4 to supply the steam of the cleaning agent to the cleaning chamber 1 and the drying chamber 4 and separate and condense the contamination components.

Next, the operation of the vacuum cleaning device according to the present embodiment having the above-described configuration will be described.

When a workpiece is cleaned by the vacuum cleaning device, the workpiece is loaded from the workpiece insertion opening $1a$ and is stored in the cleaning chamber 1. Contamination components such as cutting oil adhere to the surface of the workpiece. Moreover, the front door 3 is operated to create a sealed space in the cleaning chamber 1 and the drying chamber 4. Moreover, the vacuum pump 7 is operated to gradually decompress the cleaning chamber 1 and the drying chamber 4 to a pressure (initial pressure) of, for example, 10 kPa or lower.

Moreover, in parallel with this decompression process, the steam generation unit 2 is operated to generate cleaning steam. The cleaning steam has a saturation steam pressure and a temperature of approximately the boiling point of the cleaning solution (for example, 80 to 140° C.). Moreover, in parallel with the decompression process, the opening/closing mechanism 6 is operated to separate the cleaning chamber 1 and the drying chamber 4 into individual chambers. Further, the coolant supply unit $4m4$ of the temperature maintaining device $4m$ is operated and thus the coolant is supplied to the coolant passage R and the cooling pipe $4m1$ and the drying chamber temperature is set to a temperature lower than the cleaning chamber temperature (for example, 5 to 50° C.) after the cleaning.

In such a state, the cleaning steam is sequentially supplied from the steam generation unit 2 to the cleaning chamber 1 in a predetermined cleaning period to clean the workpiece in the cleaning chamber 1. That is, in the cleaning period, adhesion and condensation of the cleaning steam on the surface of the workpiece are continuously repeated, and the contamination components adhering to the surface of the workpiece are removed (cleaned) by flowing down the surface of the workpiece together with the condensed solution of the cleaning steam.

At a time point at which the cleaning process ends, the pressure of the cleaning chamber 1 (cleaning chamber pressure) is approximately the same as the saturation steam pressure of the cleaning steam, and the temperature of the cleaning chamber 1 is approximately the same as the temperature of the cleaning steam (approximately 80 to 140° C.). That is, the cleaning chamber pressure and the cleaning chamber temperature are quite higher than the pressure (drying chamber pressure) and the temperature (drying chamber temperature) of the drying chamber 4, which are set and maintained in advance.

A drying process of drying the workpiece in the cleaning chamber 1 is performed after the cleaning process. In this drying process, the opening/closing mechanism 6 is operated so that the cleaning chamber 1 and the drying chamber 4 in the above-described pressure and temperature relationship communicate with each other. That is, when the air cylinder 6a is operated, a state in which the outer circumferential portion of the valve body 6b is in contact with the inner surface of the drying chamber opening 1c (the side surface of the cleaning chamber 1) changes abruptly to a state in which the outer circumferential portion is separated from the inner surface and the cleaning chamber 1 and the drying chamber 4 are connected with a relatively large area in a short period.

As a result, the cleaning chamber pressure decreases rapidly and the condensed solution (residual solution) of the cleaning steam adhering to the surface of the workpiece boils instantly (boils rapidly) due to the rapid decompression. Moreover, when the cleaning chamber 1 and the drying chamber 4 are connected with a relatively large area in a short period, the steam of the residual solution (residual steam) generated from the surface of the workpiece moves at high speed from the cleaning chamber 1 (high-pressure side) to the drying chamber 4 (low-pressure side) via the gap between the valve body 6b and the drying chamber opening 1c, the connection member 5, and the steam intake opening 4j.

Moreover, the residual steam having moved to the drying chamber 4 (low-pressure side) condenses because the drying chamber temperature is maintained at a temperature lower than the cleaning chamber temperature and equal to or lower than the boiling point of the cleaning solution. Here, the condensation of the residual steam in the drying chamber 4 is performed efficiently because the larger surface area of the inner surface of the drying chamber 4 increases the likelihood of the residual steam coming in contact with the member and the temperature of the residual steam decreasing.

Here, in the condensation process of condensing the residual steam in the drying chamber 4, since the drying chamber 4 (condenser) of the present embodiment has the cooling pipe 4m1 through which the coolant circulates and which is inside the container 40 having the steam intake opening 4j, the drying chamber temperature can be maintained at a temperature lower than the cleaning chamber temperature. In this way, it is possible to shorten the condensation period of the residual steam in the drying chamber 4 and to improve the condensation performance as compared to the conventional device.

Moreover, the cooling pipe 4m1 of the present embodiment is wound in a spiral form. Thus, since the cooling pipe 4m1 has a large surface area as compared to a linear cooling pipe, it is possible to decrease the drying chamber temperature efficiently. Therefore, according to the present embodiment, it is possible to further improve the condensation efficiency of the drying chamber 4.

Moreover, the cooling pipe 4m1 of the present embodiment is disposed such that the central opening formed by the cooling pipe 4m1 being wound in a spiral form faces the steam intake opening 4j. Thus, the residual steam flowing strongly from the steam intake opening 4j is quickly cooled and condensed when it comes in contact with the cooling pipe 4m1. According to the present embodiment, it is possible to improve the condensation efficiency of the residual steam.

Moreover, since the first flat surface portion 4a of the present embodiment has a dual-shell structure in which a coolant circulates, it is possible to efficiently cool the inner side of the first flat surface portion 4a. Thus, according to the present embodiment, it is possible to improve the condensation efficiency of the residual steam. Moreover, since the circumferential surface portion 4c also has the dual-shell structure, it is possible to efficiently condense the residual steam adhering to the inner surface of the circumferential surface portion 4c.

Moreover, since the cooling pipe 4m1 of the present embodiment is spirally wound in an oval form with the long axis thereof extending in a vertical direction, the condensed solution of the residual steam adhering to the surface of the cooling pipe 4m1 can be effectively collected into the drainage port 4f. Thus, the condensed solution in the drying chamber 4 can be effectively discharged to the regenerating concentrator 8.

Moreover, in the drying chamber 4 (condenser) of the present embodiment, since the plurality of fins 4k are formed on the inner surface of the first flat surface portion 4a, which faces the steam intake opening 4j to which the residual steam flows, the residual steam flowing strongly from the steam intake opening 4j into the drying chamber 4 is quickly condensed when it comes in contact with the fins 4k located on the front side. Thus, it is possible to further improve the condensation performance and the condensation efficiency.

The present disclosure is not limited to the above-described embodiment but, for example, the following modifications may be considered.

(1) Although the cooling pipe 4m1 is wound in a spiral form in the above-described embodiment, the present disclosure is not limited to this. The cooling pipe may have a straight shape. When the cooling pipe has a straight shape, it is easy to manufacture the cooling pipe.

(2) Although the cooling pipe 4m1 is wound in a spiral form in the above-described embodiment, the cooling pipe may have a wavy shape. When the cooling pipe has a wavy shape, it is possible to install the cooling pipe even when the drying chamber has a small depth (that is, the gap between the first flat surface portion and the second flat surface portion is narrow). Thus, it is easy to install the circumferential surface portion.

(3) Although the plurality of fins 4k are disposed in the first flat surface portion in the above-described embodiment, the plurality of fins 4k may not be provided. When the plurality of fins 4k are not provided, the process of manufacturing the drying chamber is simplified.

Hereinafter, a second embodiment of the present disclosure will be described with reference to the drawings.

Figure 6:
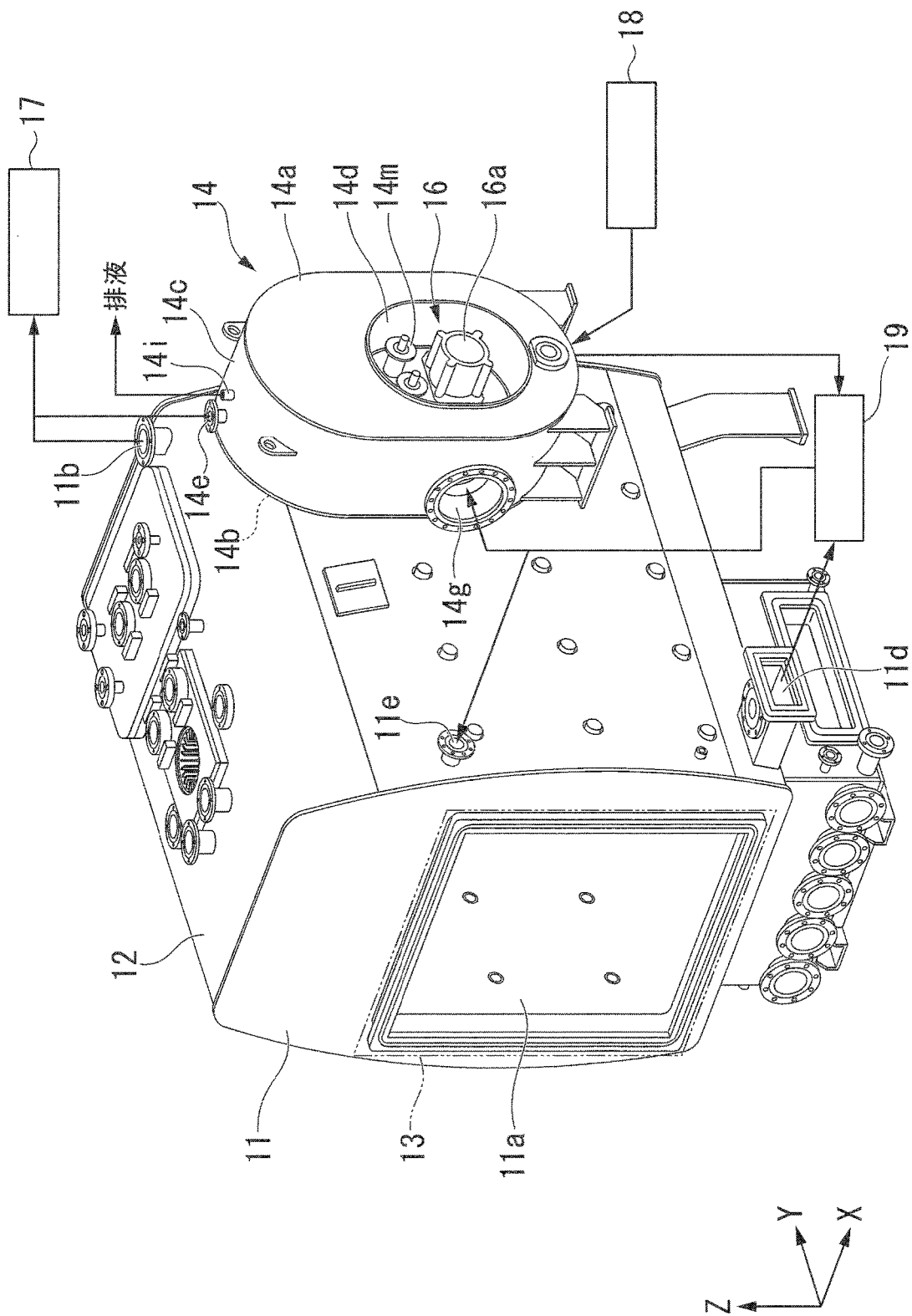
FIG. 6 is a perspective view illustrating a general schematic configuration of a vacuum cleaning device according to a second embodiment of the present disclosure.
Figure 8:
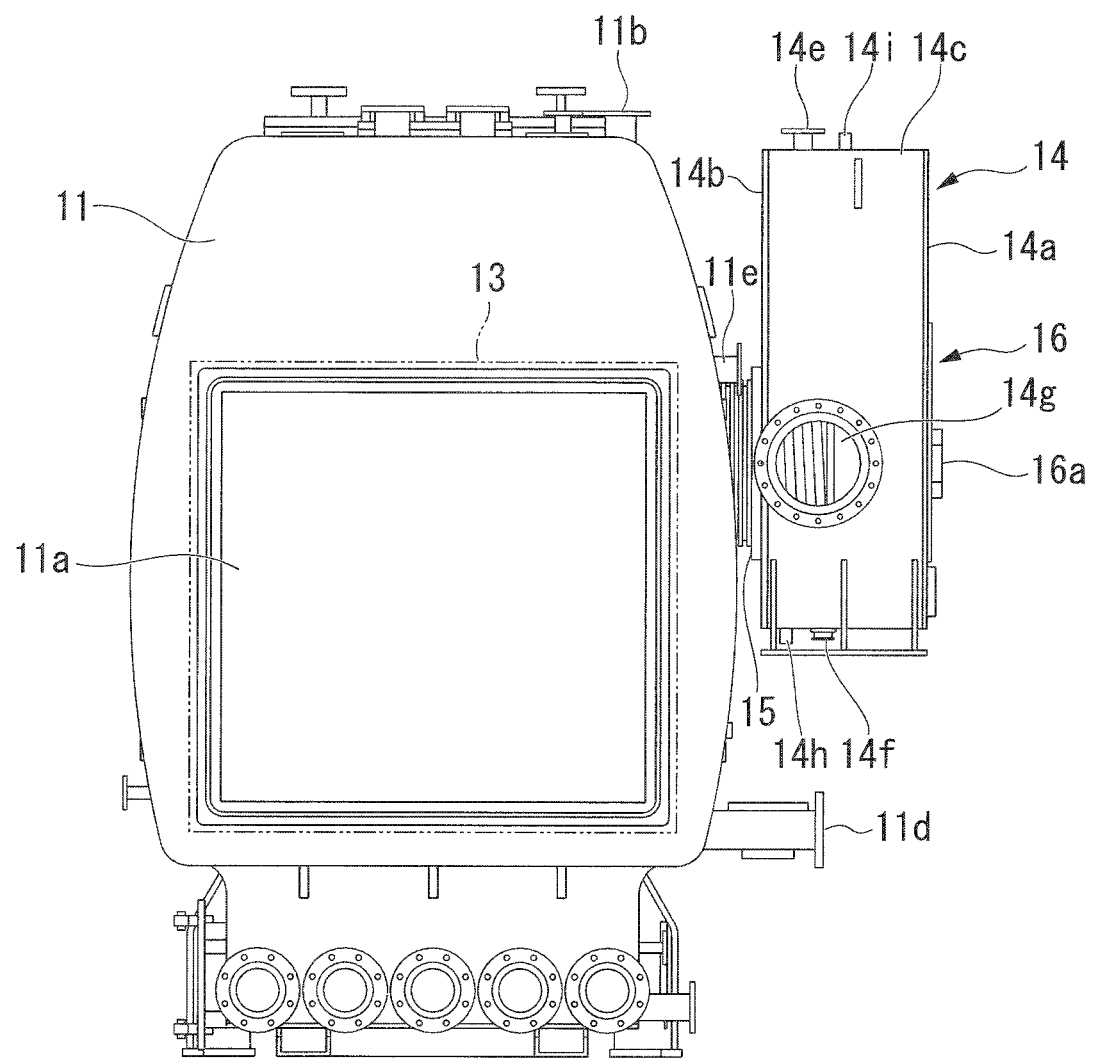
FIG. 8 is a front view illustrating a schematic configuration of the vacuum cleaning device according to the second embodiment of the present disclosure.

As illustrated in FIG. 6 or 8, a vacuum cleaning device according to the present embodiment includes a cleaning chamber 11, a steam generation unit 12, a front door 13, a drying chamber 14, a connection member 15, an opening/closing mechanism 16, a vacuum pump 17, a coolant supply source 18, and a regenerating concentrator 19. Among these constituent elements, the drying chamber 14 is a condenser according to the present embodiment.

First, an outline of the vacuum cleaning device according to the present embodiment will be described. This vacuum cleaning device is a device that cleans a workpiece (cleaning object) by applying the steam of a cleaning agent (cleaning steam) to the workpiece to which contamination components are adhered. That is, this vacuum cleaning device supplies the cleaning steam to the cleaning chamber 11 continuously for a predetermined period (cleaning period) to allow the cleaning steam to repeatedly adhere to and condense on the surface of the workpiece stored in the cleaning chamber 11. In this way, the contamination components adhering to the surface of the workpiece stored in the cleaning chamber 11 are cleaned off from the surface of the workpiece together with the condensed solution of the cleaning agent. The workpiece is, for example, a metal part to a surface of which contamination components such as cutting oil or the like adhere during machining.

Such a vacuum cleaning device is installed on a predetermined pedestal so that a vertical direction of the vacuum cleaning device extends along the Z-axis among the X, Y, and Z axes illustrated as orthogonal coordinate axes in FIG. 6. In FIG. 6, constituent elements which are not directly associated with the features of the vacuum cleaning device according to the present embodiment (for example, various pipes and valves) are not illustrated for the sake of convenience. In an actual vacuum cleaning device (actual device), a plurality of pipes and valves are mounted around the respective constituent elements and exterior parts are also mounted on the outer side of the constituent elements.

The cleaning chamber 11 is formed in a generally hollow rectangular parallelepiped shape (approximately a box shape) and the workpiece (cleaning object) is stored in an inner space. An opening (work insertion opening 11a) is formed in one side surface (front surface) of the cleaning chamber 11. The workpiece insertion opening 11a is an opening in a vertical attitude for loading and unloading the workpiece between the cleaning chamber 11 and the outside and has a rectangular shape as illustrated in the drawing. A sealing member for closely adhering to the front door 13 is formed on an entire circumference outside the periphery of the workpiece insertion opening 11a.

Figure 7:
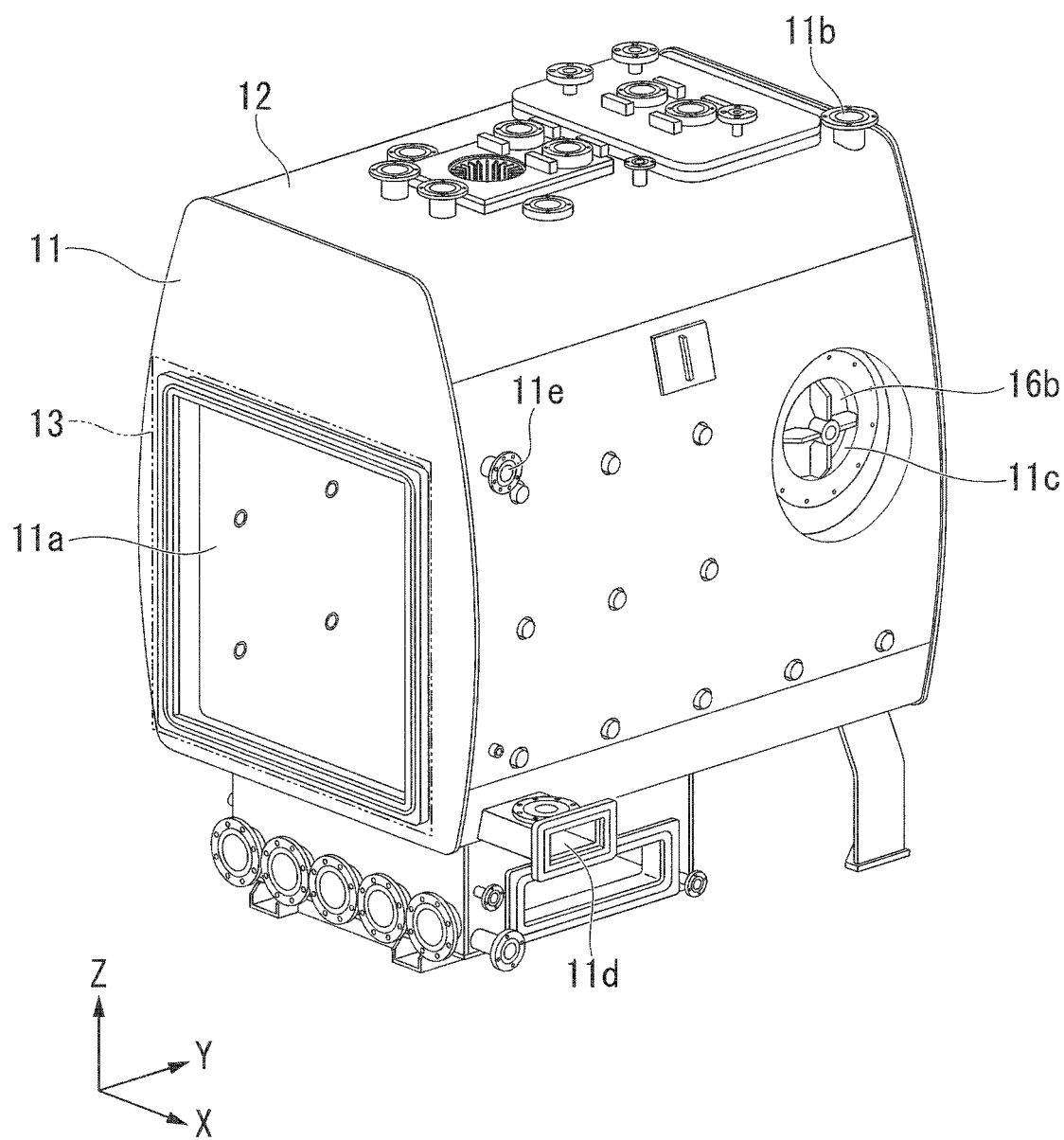
FIG. 7 is a perspective view illustrating a state in which a condenser is removed from the vacuum cleaning device according to the second embodiment of the present disclosure.

Moreover, a discharge port 11b is formed in an upper portion near the rear surface of the cleaning chamber 11. The discharge port 11b is an opening for discharging the air in the cleaning chamber 1 to the outside and is connected to the vacuum pump 17 by a pipe (not illustrated). Moreover, as illustrated in FIG. 7, a circular opening (drying chamber opening 1c) for allowing the cleaning chamber 11 to communicate with the drying chamber 14 is formed in a side surface of the cleaning chamber 11 adjacent to the drying chamber 14. That is, the cleaning chamber 1 communicates with the drying chamber 14 via the drying chamber opening 11c.

Further a drainage port 11d and a steam intake port 11e are formed in a side portion of the cleaning chamber 11. The drainage port 11d is an opening for discharging a mixed solution of the cleaning solution and the contamination components generated during cleaning of the workpiece to the outside of the cleaning chamber 11 and is connected to the regenerating concentrator 19 by a pipe (not illustrated). The steam intake port 11e is an opening for taking the steam of the cleaning solution generated by the regenerating concentrator 19 into the cleaning chamber 11 and is connected to the regenerating concentrator 19 by a pipe (not illustrated).

The steam generation unit 12 is provided in an upper portion of the cleaning chamber 11 to generate the steam of the cleaning agent. The steam generation unit 12 includes a heating unit that, for example, heats a cleaning agent to generate a cleaning steam and a steam tank that temporarily stores the cleaning steam. The steam generated by the heating unit is temporarily stored in the steam tank and the cleaning steam is supplied to the cleaning chamber 11 via the steam tank. According to such a steam generation unit 12, since the steam tank is provided, it is possible to stably supply a predetermined amount of cleaning steam to the cleaning chamber 11 for the cleaning period.

The cleaning agent is a hydrocarbon-based cleaning agent such as, for example, a normal paraffin-based cleaning agent, an isoparaffinic cleaning agent, a naphthenic cleaning agent, or an aromatic cleaning agent. More specifically, the cleaning agent is a third-class petroleum-based cleaning agent such as Teclean (registered trademark) N20, Cleansol G, and Daphne solvents which are generally known as cleaning solvents.

The front door 13 is a flat plate-like member that is provided on a front surface of the cleaning chamber 11 to close or open the workpiece insertion opening 11a. The front door 13 is, for example, a sliding door and is disposed in a vertical attitude to face the workpiece insertion opening 11a similarly to the workpiece insertion opening 11a in the vertical attitude. The front door 13 closes or opens the workpiece insertion opening 11a by moving in a left-right direction (the X-axis direction) while maintaining the vertical attitude. The front door 13 seals the cleaning chamber 11 by coming in contact with the sealing member provided outside (the side close to the front door 13) the periphery of the workpiece insertion opening 11a.

The drying chamber 4 has a round box shape as illustrated in FIG. 6 and is a condenser that condenses (liquefies) the steam (residual steam) taken in from the cleaning chamber 11. In a state in which cleaning of the workpiece is finished in the cleaning chamber 11, the surface of the workpiece and the inner surface of the cleaning chamber 11 are wet with the cleaning agent. The drying chamber 14 takes in the steam of the cleaning agent remaining in the cleaning chamber 11 after the workpiece is cleaned (residual steam) from the cleaning chamber 11 and condenses (liquefies) the steam, which will be described in detail later.

Figure 9:
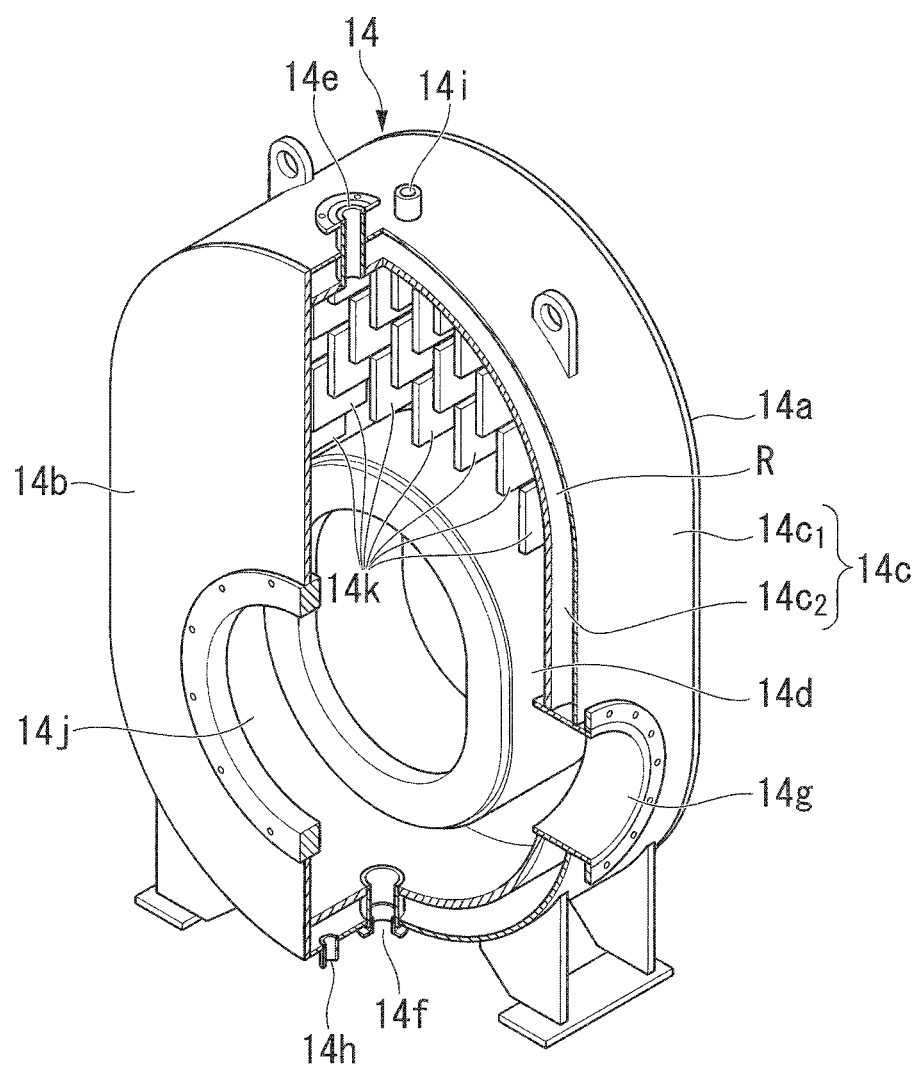
FIG. 9 is a perspective view illustrating a detailed configuration of a condenser according to the second embodiment of the present disclosure.

As illustrated in FIGS. 8 and 9 as well as FIG. 6, the drying chamber 4 includes a first flat surface portion 14a, a second flat surface portion 14b, a circumferential surface portion 14c, a depression portion 14d, a discharge port 14e, a drainage port 14f, a steam intake port 14g, a coolant intake port 14h, a coolant drainage port 14i, a steam intake opening 14j, a plurality of fins 14k, and a temperature maintaining device 14m.

The first flat surface portion 14a is a plate portion in which the plurality of fins 14k are formed and of which the outer circumference is oval. The second flat surface portion 14b is a plate portion in which the steam intake opening 14j is formed and which has approximately the same shape as the first flat surface portion 14a and is approximately parallel to the first flat surface portion 14a. That is, the second flat surface portion 14b is a portion of which the outer circumference is oval similarly to the first flat surface portion 14a. The first flat surface portion 14a and the second flat surface portion 14b which are in a parallel relation are in a vertical attitude.

The circumferential surface portion 14c is an endless plate portion that connects the outer circumference of the first flat surface portion 14a and the outer circumference of the second flat surface portion 14b. As illustrated in FIG. 9, the circumferential surface portion 14c has a dual-shell structure which includes an outer circumferential wall 14c1 and an inner circumferential wall 14c2 and in which a coolant can freely circulate. That is, in the circumferential surface portion 14c, a passage through which a coolant circulates (coolant passage R) is formed between the outer circumferential wall 14c1 and the inner circumferential wall 14c2 which face each other with a predetermined distance therebetween.

The coolant passage R communicates with the coolant intake port 14h and the coolant drainage port 14i. Although not illustrated in FIG. 9, the first flat surface portion 14a also has the dual-shell structure similarly to the circumferential surface portion 14c. The first flat surface portion 14a, the second flat surface portion 14b, and the circumferential surface portion 14c form the drying chamber 14.

As illustrated in FIG. 6, the depression portion 14d is a portion in which a predetermined area displaced slightly downward from the center of the first flat surface portion 14a is depressed. A portion (air cylinder 16a or the like) of the opening/closing mechanism 16 is attached to a bottom portion of the depression portion 14d (a portion of the first flat surface portion 14a). The discharge port 14e is an opening for discharging the air in the drying chamber 14 to the outside and is connected to the vacuum pump 17 by a pipe (not illustrated). The drainage port 14f is an opening for discharging a condensed solution generated when the residual steam is condensed in the drying chamber 14 (residual condensed solution) to the outside and is connected to the regenerating concentrator 19 by a pipe (not illustrated).

The steam intake port 14g is an opening for taking the steam of the cleaning solution generated by the regenerating concentrator 19 (regeneration steam) into the drying chamber 14 and is connected to the regenerating concentrator 19 by a pipe (not illustrated). The coolant intake port 14h is an opening for taking the coolant into the coolant passage R and is connected to a coolant supply source 18 by a pipe (not illustrated). The coolant drainage port 14i is an opening for discharging the coolant in the coolant passage R to the outside of the drying chamber 14 and is connected to a drainage tank (not illustrated) by a pipe (not illustrated).

The steam intake opening 14j is a circular opening having a predetermined size, formed in the second flat surface portion 14b. The steam intake opening 14j is formed at a position corresponding to the position of the depression portion 14d formed in the first flat surface portion 14a (that is, a position which is slightly displaced downward from the center of the second oval flat surface portion 14b).

As illustrated in FIG. 9, the plurality of fins 14k are rectangular planar members formed on the inner side of the first flat surface portion 14a to protrude toward the drying chamber 14. That is, these fins 14k are formed on the inner surface of the first flat surface portion 14a, which faces the steam intake opening 14j. More specifically, these fins 14k are formed on the upper side only of the depression portion 14d of the first flat surface portion 14a and are provided at predetermined intervals in a vertical direction and a horizontal direction to extend in the vertical direction (Z-axis direction).

The temperature maintaining device 14m is a device that maintains the temperature of the drying chamber 14 (drying chamber temperature) at a predetermined temperature lower than the temperature of the cleaning chamber 11 (cleaning chamber temperature) and is provided in the depression portion 14d (the first flat surface portion 14a) as illustrated in FIG. 6. More specifically, the temperature maintaining device 14m maintains the drying chamber temperature at a temperature lower than the cleaning chamber temperature with the aid of a cooling pipe (not illustrated) that extends in the drying chamber 14. The drying chamber temperature which is set and maintained by the temperature maintaining device 14m is, for example, 5 to 50° C. The drying chamber temperature is set and maintained at a predetermined temperature by a predetermined coolant supplied from the coolant supply source 18 to the coolant passage R as well as the temperature maintaining device 14m.

The connection member 15 is a cylindrical member that connects the drying chamber opening 11c of the cleaning chamber 11 and the steam intake opening 14j of the drying chamber 14 and an axial direction thereof is set to the horizontal direction (X-axis direction). The connection member 15 is, for example, a cylindrical metallic bellows and is disposed between the drying chamber opening 11c and the steam intake opening 14j. In the vacuum cleaning device according to the present embodiment, since the connection member 15 is configured as a metallic bellows, the influence of thermal deformation of the cleaning chamber 11 on the drying chamber 14 is reduced.

The opening/closing mechanism 16 is configured to close or open the drying chamber opening 11c illustrated in FIG. 7 and includes the air cylinder 16a illustrated in FIG. 6, a valve body 16b illustrated in FIG. 7, and the like. The air cylinder 16a is provided in the depression portion 14d so that a movable rod thereof extends in the axial direction (X-axis direction) of the connection member 5. Moreover, the valve body 16b is fixed to the distal end of the movable rod.

The valve body 6b is a circular member provided on a side of the drying chamber opening 11c close to the cleaning chamber 11 and has a shape slightly larger than the drying chamber opening 11c. The valve body 6b is connected to the distal end of the movable rod on the side of the drying chamber opening 11c close to the connection member 15 (close to the drying chamber 14).

Such an opening/closing mechanism 16 closes the drying chamber opening 11c when the air cylinder 16a draws the movable rod and the outer circumferential portion of the valve body 16b comes into contact with the inner surface (the side surface of the cleaning chamber 11) of the drying chamber opening 11c. On the other hand, the opening/closing mechanism 16 opens the drying chamber opening 11c when the air cylinder 16a pushes the movable rod and the outer circumferential portion of the valve body 16b moves away from the inner surface (the side surface of the cleaning chamber 11) of the drying chamber opening 11c.

The vacuum pump 17 is connected to the discharge ports 11b and 14e via a pipe (not illustrated) to discharge the air in the cleaning chamber 11 and the drying chamber 14 to the outside. The coolant supply source 18 is connected to the coolant intake port 14h via a pipe (not illustrated) to supply the coolant to the drying chamber 14. The coolant is, for example, water. The regenerating concentrator 19 is connected to the drainage ports 11d and 14f and the steam intake ports 11e and 14g via a pipe (not illustrated) to re-liquefy only the cleaning agent among the cleaning agent and the condensed solution of the contamination components collected from the cleaning chamber 11 and the drying chamber 14 to supply the steam of the cleaning agent to the cleaning chamber 11 and the drying chamber 14 and separate and condense the contamination components.

Next, the operation of the vacuum cleaning device according to the second embodiment having the above-described configuration will be described.

When a workpiece is cleaned by the vacuum cleaning device, the workpiece is loaded from the workpiece insertion opening 11a and is stored in the cleaning chamber 11. Contamination components such as cutting oil adhere to the surface of the workpiece. Moreover, the front door 13 is operated to create a sealed space in the cleaning chamber 11 and the drying chamber 14. Moreover, the vacuum pump 7 is operated to gradually decompress the cleaning chamber 11 and the drying chamber 14 to a pressure (initial pressure) of, for example, 10 kPa or lower.

Moreover, in parallel with this decompression process, the steam generation unit 12 is operated to generate cleaning steam. The cleaning steam has a saturation steam pressure and a temperature of approximately the boiling point of the cleaning solution (for example, 80 to 140° C.). Moreover, in parallel with the decompression process, the opening/closing mechanism 16 is operated to separate the cleaning chamber 11 and the drying chamber 14 into individual chambers. Further, the temperature maintaining device 14*m* and the coolant supply source 18 are operated and the drying chamber temperature is set to a temperature lower than the cleaning chamber temperature (for example, 5 to 50° C.) after the cleaning.

In such a state, the cleaning steam is sequentially supplied from the steam generation unit 12 to the cleaning chamber 11 for a predetermined cleaning period and the workpiece in the cleaning chamber 11 is cleaned. That is, in the cleaning period, adhesion and condensation of the cleaning steam are continuously repeated on the surface of the workpiece, and the contamination components adhering to the surface of the workpiece are removed (cleaned) by flowing down the surface of the workpiece together with the condensed solution of the cleaning steam.

At a time point at which the cleaning process ends, the pressure of the cleaning chamber 11 (cleaning chamber pressure) is approximately the same as the saturation steam pressure of the cleaning steam, and the temperature of the cleaning chamber 11 is approximately the same as the temperature of the cleaning steam (approximately 80 to 140° C.). That is, the cleaning chamber pressure and the cleaning chamber temperature are quite higher than the pressure (drying chamber pressure) and the temperature (drying chamber temperature) of the drying chamber 14, which are set and maintained in advance.

A drying process of drying the workpiece in the cleaning chamber 11 is performed subsequently to the cleaning process. In this drying process, the opening/closing mechanism 16 is operated so that the cleaning chamber 11 and the drying chamber 14 being the above-described pressure and temperature relationship communicate with each other. That is, when the air cylinder 16*a* is operated, a state in which the outer circumferential portion of the valve body 16*b* is in contact with the inner surface of the drying chamber opening 11*c* (the side surface of the cleaning chamber 11) changes abruptly to a state in which the outer circumferential portion is separated from the inner surface and the cleaning chamber 11 and the drying chamber 14 are connected with a relatively large area in a short period.

As a result, the cleaning chamber pressure decreases rapidly and the condensed solution of the cleaning steam adhering to the surface of the workpiece (residual solution) boils instantly (boils rapidly) due to the rapid decompression. Moreover, when the cleaning chamber 11 and the drying chamber 14 are connected with a relatively large area in a short period, the steam (residual steam) of the residual solution generated from the surface of the workpiece moves at high speed from the cleaning chamber 11 (high-pressure side) to the drying chamber 14 (low-pressure side) via the gap between the valve body 16*b* and the drying chamber opening 11*c*, the connection member 15, and the steam intake opening 14*j*.

Moreover, the residual steam having moved to the drying chamber 14 (low-pressure side) condenses because the drying chamber temperature is maintained at a lower temperature than the cleaning chamber temperature and equal to or lower than the boiling point of the cleaning solution. Here, the condensation of the residual steam in the drying chamber 14 is performed efficiently because the larger surface area of the inner surface of the drying chamber 14 increases the likelihood of the residual steam coming in contact with the member and the temperature of the residual steam decreasing.

Here, in the condensation process of condensing the residual steam in the drying chamber 14, since the drying chamber 14 (condenser) of the present embodiment has the plurality of fins 4*k* which are formed on the inner surface of the first flat surface portion 4*a*, which faces the steam intake opening 4*j* to which the residual steam flows, the residual steam flowing strongly from the steam intake opening 4*j* into the drying chamber 4 is quickly condensed when it comes in contact with the fins 4*k* located on the front side. If the plurality of fins 14*k* are provided on the same side as the steam intake opening 14*j* (that is, on the inner surface of the second flat surface portion 14*b*), since the plurality of fins 14*k* are located on the rear side in relation to the flowing direction of the residual steam, the condensation efficiency decreases.

Moreover, because the plurality of fins 14*k* of the present embodiment are provided at predetermined intervals in the vertical direction (Z-axis direction) and the horizontal direction (Y-axis direction), that is, the fins are distributed on the surface facing the steam intake opening 14*j*, the contact efficiency with the residual steam is improved. Therefore, according to the present embodiment, it is possible to improve the condensation efficiency of the residual steam in the drying chamber 14. Thus, according to the present embodiment, it is possible to efficiently condense the residual steam flowing into the drying chamber 14 and to improve the condensation performance as compared to the conventional device.

Moreover, since the plurality of fins 14*k* of the present embodiment extend in the vertical direction (Z-axis direction), the condensed solution of the residual steam condensed on the surface thereof falls down relatively quickly and is removed from the surface. As a result, it is possible to suppress the condensed solution of the residual steam from remaining on the surface of the fin 14*k*. Thus, according to the present embodiment, it is possible to improve the condensation efficiency of the residual steam.

Moreover, since the first flat surface portion 14*a* of the present embodiment has a dual-shell structure in which a coolant circulates, it is possible to efficiently cool the inner surface of the first flat surface portion 14*a* and the plurality of fins 14*k*. Thus, according to the present embodiment, it is possible to improve the condensation efficiency of the residual steam. Moreover, since the circumferential surface portion 14*c* also has the dual-shell structure, it is possible to efficiently condense the residual steam adhering to the inner surface of the circumferential surface portion 14*c*.

Moreover, since the circumferential surface portion 14*c* of the present embodiment is formed in an oval shape to correspond to the outer circumference shape of the first flat surface portion 14*a* and the second flat surface portion 14*b*, the condensed solution of the residual steam can be effectively collected into the drainage port 14*f*. Thus, the condensed solution in the drying chamber 14 can be effectively discharged to the regenerating concentrator 19.

The present disclosure is not limited to the above-described embodiment but, for example, the following modifications may be considered.

(1) Although the plurality of fins 14k extend in the vertical direction (Z-axis direction) and are distributed at predetermined intervals in the vertical direction (Z-axis direction) and the horizontal direction (Y-axis direction) in the above-described embodiment, the present disclosure is not limited to this. The plurality of fins 14k may be disposed in other manners as long as the fins are provided on the surface facing the steam intake opening 14j.

(2) Although the outer circumference shape of the first flat surface portion 14a and the second flat surface portion 14b and the outer shape of the circumferential surface portion 14c are oval in the above-described embodiment, a circular shape (perfectly circular shape) or an elliptical shape may be used instead of the oval shape.

(3) Although the first flat surface portion 14a and the second flat surface portion 14b are in the vertical attitude in the above-described embodiment, the present disclosure is not limited to this. For example, the first flat surface portion 14a and/or the second flat surface portion 14b may be slightly inclined from the vertical attitude.

INDUSTRIAL APPLICABILITY

According to the present disclosure, it is possible to further improve the condensation efficiency by shortening the condensation period in the condenser.

The invention claimed is:

1. A condenser including a container having a steam intake opening, the condenser liquefying steam received from the steam intake opening into the container, the condenser comprising:
   a first flat surface portion facing the steam intake opening,
   a second flat surface portion provided with the steam intake opening and disposed parallel to the first flat surface portion,
   a cooling pipe disposed in the container and through which coolant circulates,
   wherein the container has a dual-shell structure in which the coolant can circulate,
   wherein the cooling pipe is wound in a spiral to form a central opening, and the cooling pipe is disposed so that the central opening formed by the cooling pipe is aligned with the steam intake opening,
   wherein a plurality of fins extend in a vertical direction and are disposed at predetermined intervals in the vertical direction and in a horizontal direction on the first flat surface portion, and
   a vacuum pump connected to a discharge port of the condenser and which decreases an internal pressure in the condenser.

2. The condenser according to claim 1, the condenser further comprising:
   a circumferential surface portion that connects an outer circumference of the first flat surface portion and an outer circumference of the second flat surface portion,
   wherein the outer circumference of the first flat surface portion is circular or oval,
   wherein the first flat surface portion facing the steam intake opening is formed in a dual-shell structure in which coolant can circulate, and
   wherein the circumferential surface portion is formed in a dual-shell structure in which coolant can circulate.

3. The condenser according to claim 1, wherein:
   steam entering the container by the steam intake opening is condensed by contact with the cooling pipe and contact with the plurality of fins; and
   the condenser further including a drain communicating with inside of the container which drains condensed liquid from inside of the container.

4. A cleaning device comprising a cleaning chamber and the condenser according to claim 1.

5. A cleaning device comprising a cleaning chamber and the condenser according to claim 2.

6. A cleaning device comprising a cleaning chamber and a condenser, the condenser including a container having a steam intake opening, the condenser liquefying steam received from the steam intake opening into the container, the condenser comprising:
   a first flat surface portion facing the steam intake opening,
   a second flat surface portion provided with the steam intake opening and disposed parallel to the first flat surface portion,
   a cooling pipe disposed in the container and through which coolant circulates,
   wherein the container has a dual-shell structure in which the coolant can circulate,
   wherein the cooling pipe is wound in a spiral to form a central opening, and the cooling pipe is disposed so that the central opening formed by the cooling pipe is aligned with the steam intake opening,
   wherein a plurality of fins extend in a vertical direction and are disposed at predetermined intervals in the vertical direction and in a horizontal direction on the first flat surface portion;
   a door and an opening through which articles to be cleaned are inserted and removed from the cleaning chamber;
   a steam generating unit which generates steam for cleaning in the cleaning chamber;
   a vacuum pump coupled to the cleaning chamber and which reduces pressure in the cleaning chamber; and
   wherein the condenser is coupled to the cleaning chamber such that steam used for cleaning in the cleaning chamber is then fed to the condenser.

7. The cleaning device of claim 6, wherein the cleaning chamber includes a drying chamber opening in communication with the steam intake opening of the condenser.

8. The cleaning device according to claim 7, wherein the drying chamber opening is located in a side surface of the cleaning chamber.

9. The cleaning device according to claim 6, wherein the condenser includes a discharge port connected to the vacuum pump.

10. A condenser including a container having a steam intake opening, the condenser liquefying steam received from the steam intake opening into the container, the condenser comprising:
    a first flat surface portion facing the steam intake opening,
    a second flat surface portion provided with the steam intake opening and disposed parallel to the first flat surface portion,
    a cooling pipe disposed in the container and through which coolant circulates,
    wherein the container has a dual-shell structure in which the coolant can circulate,
    wherein the cooling pipe is wound in a spiral to form a central opening, and the cooling pipe is disposed so that the central opening formed by the cooling pipe is aligned with the steam intake opening, wherein a plurality of fins extend in a vertical direction and are disposed at predetermined intervals in the vertical direction and in a horizontal direction on the first flat surface portion;

wherein steam entering the container by the steam intake opening is condensed by contact with the cooling pipe and contact with the plurality of fins; and the condenser further including a drain communicating with inside of the container which drains condensed liquid from inside of the container;

the condenser further including:

a coolant collection pipe nozzle through which coolant exits the cooling pipe;

a coolant drainage port through which coolant exits from between walls of the dual-shell structure;

a vacuum pump; and a discharge port which communicates inside of the container with the vacuum pump such that the vacuum pump reduces pressure inside of the container.

* * * * *